US011637650B2

(12) United States Patent
Gao et al.

(10) Patent No.: US 11,637,650 B2
(45) Date of Patent: Apr. 25, 2023

(54) METHOD AND DEVICE FOR PERFORMING COMMUNICATION

(71) Applicant: NEC CORPORATION, Tokyo (JP)

(72) Inventors: Yukai Gao, Beijing (CN); Chuangxin Jiang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/318,995

(22) PCT Filed: Jul. 19, 2016

(86) PCT No.: PCT/CN2016/090451
§ 371 (c)(1),
(2) Date: Jan. 18, 2019

(87) PCT Pub. No.: WO2018/014191
PCT Pub. Date: Jan. 25, 2018

(65) Prior Publication Data
US 2019/0280801 A1    Sep. 12, 2019

(51) Int. Cl.
*H04W 88/06* (2009.01)
*H04L 5/14* (2006.01)
(Continued)

(52) U.S. Cl.
CPC .......... *H04L 1/0006* (2013.01); *H04L 5/0005* (2013.01); *H04L 5/0048* (2013.01);
(Continued)

(58) Field of Classification Search
CPC ... H04L 5/0007; H04L 1/0006; H04L 5/0005; H04L 5/0037; H04L 5/1469; H04L 65/40;
(Continued)

(56) References Cited

U.S. PATENT DOCUMENTS 5,978,414 A   11/1999 Nara
7,577,085 B1*  8/2009 Narasimhan .......... H04L 1/0606
                                                   370/206
(Continued)

FOREIGN PATENT DOCUMENTS

CN      101141756 A    3/2008
CN      101179825 A    5/2008

OTHER PUBLICATIONS

Communication dated Feb. 14, 2020, from the European Patent Office in European Application No. 16909121.2.
(Continued)

*Primary Examiner* — Ivan O Latorre
*Assistant Examiner* — Vanneilian Lalchinthang
(74) *Attorney, Agent, or Firm* — Sughrue Mion, PLLC

(57) ABSTRACT

Embodiments of the disclosure provide a method and device for performing communication. The method comprises: determining a target transmission pattern from a set of candidate transmission patterns, wherein each of the candidate transmission patterns contains a DL transmission part and/or a UL transmission part, and the candidate transmission patterns differ from one another in terms of subcarrier spaces of the respective DL transmission parts and/or the UL transmission parts; and performing communication between a network device and a terminal device by using the target transmission pattern.

12 Claims, 9 Drawing Sheets

(51) Int. Cl.
*H04W 72/12* (2009.01)
*H04L 1/00* (2006.01)
*H04L 5/00* (2006.01)
*H04L 65/40* (2022.01)
*H04W 4/70* (2018.01)

(52) U.S. Cl.
CPC ......... *H04L 65/40* (2013.01); *H04W 72/1205* (2013.01); *H04L 5/0007* (2013.01); *H04W 4/70* (2018.02)

(58) Field of Classification Search
CPC ....... H04L 5/14; H04L 5/0044; H04L 5/0048; H04L 5/0053; H04L 5/0051; H04W 88/06; H04W 72/1205; H04W 4/70; H04B 7/0623
USPC ......................................................... 370/329
See application file for complete search history.

(56) References Cited

U.S. PATENT DOCUMENTS

| | | | | |
|---|---|---|---|---|
| 8,767,523 | B1* | 7/2014 | Narasimhan | H04L 1/0606 370/208 |
| 2012/0257584 | A1* | 10/2012 | Behravan | H04W 72/1289 370/329 |
| 2013/0102342 | A1* | 4/2013 | Tesanovic | H04B 7/0623 455/507 |
| 2013/0128935 | A1* | 5/2013 | Janani | H04B 7/0413 375/222 |
| 2015/0365936 | A1* | 12/2015 | Nishio | H04W 72/042 370/329 |
| 2016/0119840 | A1* | 4/2016 | Loehr | H04L 1/1822 370/331 |
| 2016/0254892 | A1* | 9/2016 | Kim | H04L 5/0016 370/280 |
| 2017/0170936 | A1* | 6/2017 | Sundararajan | H04W 72/0446 |
| 2018/0219662 | A1* | 8/2018 | Kim | H04W 72/048 |
| 2018/0254851 | A1* | 9/2018 | Roessel | H04L 1/009 |
| 2018/0294942 | A1* | 10/2018 | Byun | H04W 72/0446 |
| 2019/0052504 | A1* | 2/2019 | Hayashi | H04L 5/0048 |
| 2019/0132228 | A1* | 5/2019 | Tang | H04L 43/0823 |

OTHER PUBLICATIONS

Huawei, HiSilicon, "Discussion on frame structure for NR", 3GPP TSG RAN WG1 Meeting #85, R1-164032, May 23-27, 2016, Nanjing, China, pp. 1-8 (8 pages total).
Guangdong OPPO Mobile Telecom, "Frame structure supporting flexible parameter allocations", TSG-RAN WG1 #85, R1-164472, May 23-27, 2016, Nanjing, China, pp. 1-2 (2 pages total).
LG Electronics, "Support different numerology and different usage scenarios", 3GPP TSG RAN WG1 Meeting #85, R1-164561, May 23-27, 2016, Nanjing, China, pp. 1-6 (6 pages total).
Communication dated Mar. 31, 2020, from the Japanese Patent Office in Application No. 2019-502175.
Office Action dated Nov. 4, 2020 in Chinese Application No. 201680087782.4.
Huawei, HiSilicon, "Remaining issues on the introduction of supporting TDD for R13 eMTC", 3GPP TSG RAN WG1 Meeting #84, St Julian's, Malta, Feb. 15-19, 2016, R1-160752 (10 pages total).
Communication dated Feb. 11, 2021, from the European Patent Office in European Application No. 16909121.2.
"Discussion on the base subcarrier spacing for NR", Samsung, 3GPP TSG RAN WG1, May 23-27, 2016, pp. 1-3, #85.
International Search Report for PCT/CN2016/090451 dated Apr. 14, 2017 [PCT/ISA/210].
Written Opinion for PCT/CN2016/090451 dated Apr. 14, 2017 [PCT/ISA/237].

* cited by examiner

METHOD AND DEVICE FOR PERFORMING COMMUNICATION

FIELD OF THE INVENTION

Embodiments of the present disclosure generally relate to communication techniques. More particularly, embodiments of the present disclosure relate to a method and device for performing communication.

BACKGROUND OF THE INVENTION

With the development of communication technologies, frequency ranges up to 100 GHz has been studied with the objective of a single technical framework addressing as many as possible usage scenarios. It has been defined some requirements and deployment scenarios, such as, enhanced mobile broadband (eMBB), ultra-reliable and low latency communications (URLLC), massive machine-type-communications (mMTC), and so on.

Generally, eMBB has a strict requirement on high peak data rate, but a relatively loose requirement on user plane latency, for example, 4 ms for uplink (UL) and downlink (DL) transmission. In contrast, URLLC requires ultra-low latency and high reliability, for example, it may require the user plane latency to be, for example, 0.5 ms for UL and DL transmission.

If a terminal device requiring eMBB service (also referred to as "eMBB terminal device") and another terminal device requiring URLLC service (also referred to as "URLLC terminal device") multiplexed in the same transmission pattern, such as a subframe, the user plane latency of eMBB may be multiple times of the user plane latency of URLLC. Thus, the eMBB terminal device may be scheduled with multiple subframes, and URLLC UE may be scheduled with one subframe for meeting a stricter user plane latency requirement.

Conventionally, UL transmission and DL transmission have been configured in the whole bandwidth. In this case, if the eMBB terminal device and the URLLC terminal device are multiplexed in time and/or frequency domain, resource utilization is low and some resources may be wasted.

Therefore, there is a need for a scheme for signal transmission to achieve high utilization of the time and/or frequency resources.

SUMMARY OF THE INVENTION

The present disclosure proposes a solution for performing communication to achieve high utilization of the time and/or frequency resources.

According to a first aspect of embodiments of the present disclosure, embodiments of the present disclosure provide a method performed by a device. The device determines a target transmission pattern from a set of candidate transmission patterns. Each of the candidate transmission patterns contains a DL transmission part and/or a UL transmission part, and the candidate transmission patterns differ from one another in terms of subcarrier spaces of the respective DL transmission parts and/or the UL transmission parts. Then, communication between a network device and a terminal device is performed by using the target transmission pattern.

According to a second aspect of embodiments of the present disclosure, embodiments of the present disclosure provide a device for performing communication. The device comprises: a controller configured to determining a target transmission pattern from a set of candidate transmission patterns, wherein each of the candidate transmission patterns contains a DL transmission part and/or a UL transmission part, and the candidate transmission patterns differ from one another in terms of subcarrier spaces of the respective DL transmission parts and/or the UL transmission parts; and a transceiver configured to perform communication between a network device and a terminal device by using the target transmission pattern.

Other features and advantages of the embodiments of the present disclosure will also be apparent from the following description of specific embodiments when read in conjunction with the accompanying drawings, which illustrate, by way of example, the principles of embodiments of the present disclosure.

BRIEF DESCRIPTION OF THE DRAWINGS

Embodiments of the present disclosure are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

Figure 1:
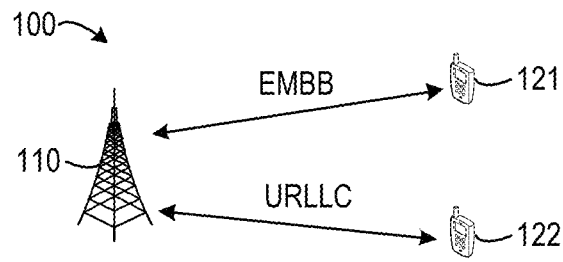
FIG. 1 illustrates a schematic diagram of a communication system 100 according to embodiments of the present disclosure.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

The term "network device" includes, but not limited to, a base station (BS), a gateway, a management entity, and other suitable device in a communication system. The term "base station" or "BS" represents a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

Now some exemplary embodiments of the present disclosure will be described below with reference to the figures. Reference is first made to FIG. 1, which illustrates schematic diagram of a communication system 100 according to embodiments of the present disclosure.

In the communication system 100, a network device (also referred to as BS hereafter) 110 communicates with two terminal devices (also referred to as UEs hereafter) 121 and 122 by using the same or different transmission patterns. The BS 110 is to provide an eMBB service to UE 121 and thus UE 121 may be called as an eMBB UE. The BS 110 is to provide a URLLC service to UE 122 and thus UE 122 may be called as a URLLC UE.

The term "transmission pattern" refers to settings regarding resource in time domain and/or frequency domain. For instance, a transmission pattern may correspond to one or more subframes or a certain number of symbols in time domain, and may correspond to one or more subcarriers in frequency domain. A transmission pattern contains a DL transmission part and/or a UL transmission part. A transmission pattern differs from another in terms of subcarrier spaces of the respective DL transmission parts and/or the UL transmission parts. In embodiments of the present disclosure, transmission patterns may include a set of candidate transmission patterns and a target transmission pattern, wherein the target transmission pattern is selected or determined from the set of candidate transmission patterns. The set of candidate transmission patterns may include one or more downlink-centric transmission patterns mainly used for downlink data transmission, and/or one or more uplink-centric transmission patterns mainly used for uplink data transmission.

Figure 2:
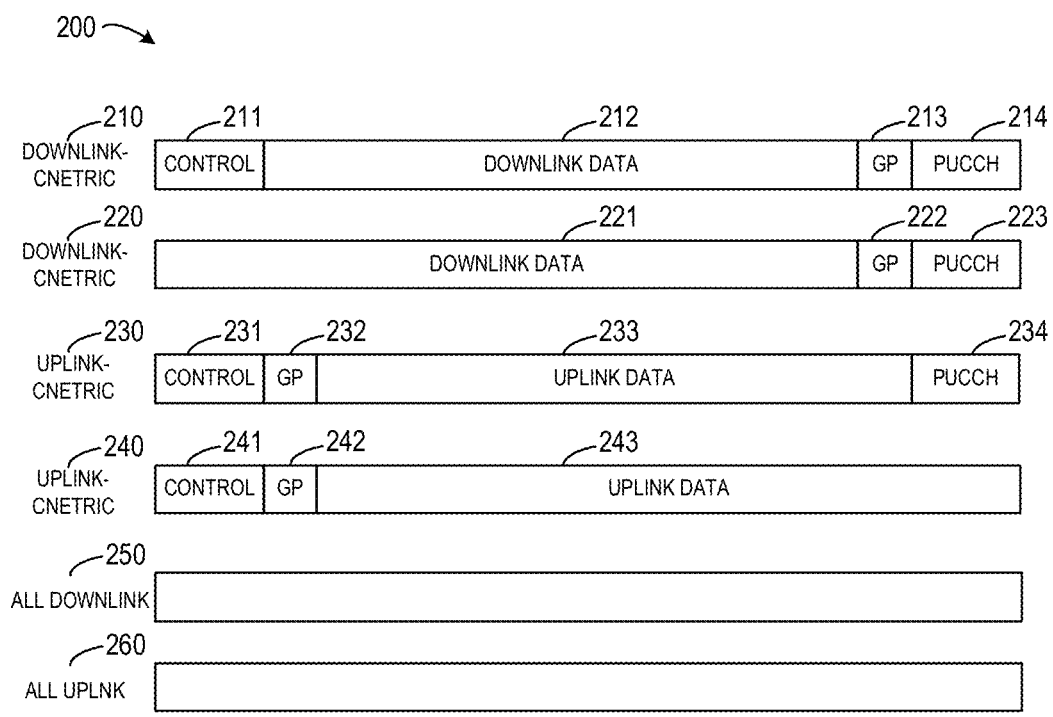
FIG. 2 illustrates a schematic diagram 200 of transmission patterns according to embodiments of the present disclosure.

FIG. 2 illustrates a diagram of downlink-centric transmission patterns and uplink-centric transmission patterns. As shown in FIG. 2, the downlink-centric transmission pattern 210 includes a downlink transmission part 211 for transmitting downlink control information, a downlink transmission part 212 for transmitting downlink data, a guard period (GP) part 213 and an uplink transmission part 214 (for example, Physical Uplink Control Channel (PUCCH)) for transmitting uplink control information. In the transmission pattern 210, the downlink transmission part 212 for transmitting the downlink data is longer than other parts, and thus it is called as a downlink-centric transmission pattern.

Similar to the downlink-centric transmission pattern 210, the downlink-centric transmission pattern 220 includes a downlink transmission part 221 for transmitting downlink data, a guard period (GP) part 222 and an uplink transmission part 223. The main difference between the downlink-centric transmission patterns 210 and 220 lies in that the transmission pattern 220 does not include a part for transmitting downlink control information.

The uplink-centric transmission pattern 230 includes a downlink transmission part 231 for transmitting downlink control information, a GP part 232, an uplink transmission part 233 for transmitting uplink data, and an uplink transmission part 234 (for example, PUCCH) for transmitting uplink control information. In the transmission pattern 230, the uplink transmission part 233 for transmitting the uplink data is longer than other parts, and thus the transmission pattern 230 is referred to as an uplink-centric transmission pattern.

Similar to the uplink-centric transmission pattern 230, the uplink-centric transmission pattern 240 includes a downlink transmission part 241 for transmitting downlink control information, a GP part 242 and an uplink transmission part 243 for transmitting uplink data. The main difference between the uplink-centric transmission patterns 230 and 240 lies in that the transmission pattern 240 does not include a part for transmitting uplink control information.

FIG. 2 also shows an all downlink transmission pattern 250 which is fully used for DL transmission, and an all uplink transmission pattern 260 which is fully used for UL transmission.

It is to be understood that, unless describing to the contrary, the term "transmission" or "communication" includes transmission or communication of control information and/or data, and the term "signal" used herein includes control information and/or data.

Conventionally, eMBB has a relatively loose requirement on user plane latency, for example, 4 ms for UL/DL transmission. In contrast, URLLC requires relatively strict user plane latency, for example, 0.5 ms for UL/DL transmission. In the example of FIG. 1, the eMBB UE 121 is scheduled with multiple subframes, and URLLC UE 122 is scheduled with one subframe for meeting the strict user plane latency requirement. If the eMBB UE 121 and the URLLC UE 122 are multiplexed in frequency domain, some resources may be wasted, which is undesirable.

Figure 3:
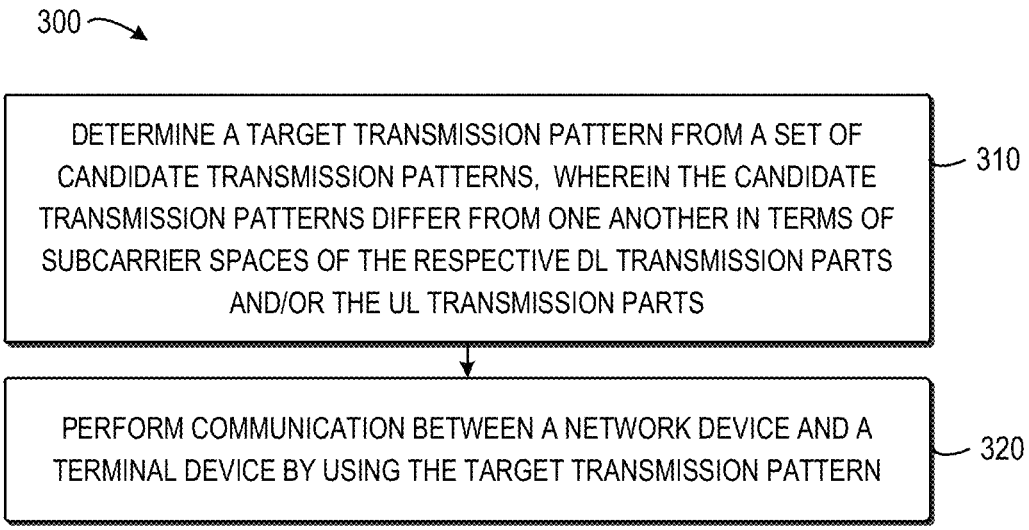
FIG. 3 illustrates a flow chart of a method 300 for performing communication according to embodiments of the present disclosure.

To solve this problem, embodiments of the present disclosure propose a solution as discussed below to reduce waste of the time and/or frequency resources. Now some exemplary embodiments of the present disclosure will be described below with reference to the following figures. FIG. 3 illustrates a flow chart of a method 300 for signal transmission according to embodiments of the present disclosure. The method 300 may be implemented by the BS 110, the terminal device 121, the terminal device 122 or other suitable device.

The method 300 is entered in block 310, where a target transmission pattern is determined from a set of candidate transmission patterns. Each of the candidate transmission patterns contains a DL transmission part and/or a UL transmission part, and the candidate transmission patterns differ from one another in terms of subcarrier spaces of the respective DL transmission parts and/or the UL transmission parts.

Figure 4:
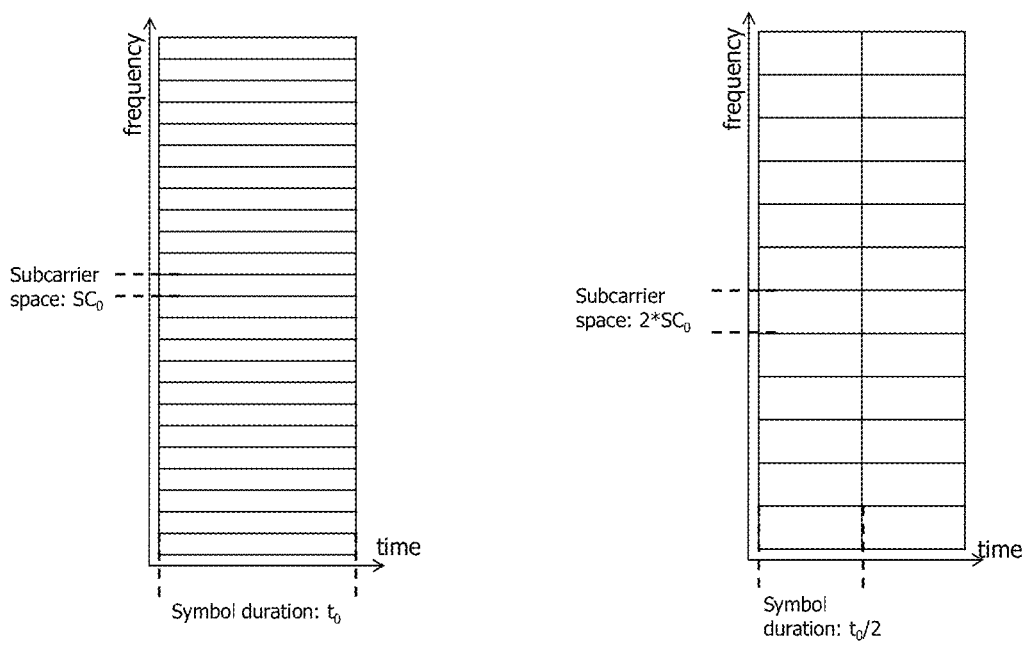
FIG. 4 illustrates a schematic diagram 400 of a subcarrier space and a symbol duration according to embodiments of the present disclosure.

As discussed above, the transmission pattern may correspond to one subframe or a certain number of symbols in time domain, and may correspond to one or more subcarriers in frequency domain. In embodiments of the present disclosure, the subcarrier space refers to a space between two subcarriers and is inversely proportional to a time duration of a symbol (also referred to as "symbol duration"). FIG. 4 illustrates a schematic diagram 400 of a subcarrier space and a symbol duration according to embodiments of the present disclosure. A symbol duration may be calculated according to the reciprocal of the subcarrier space. For example, if a subcarrier space is 15 kHz, the corresponding symbol duration may be 66.67 us. In the example of FIG. 4, if the subcarrier space is SC0=15 kHz, the corresponding symbol duration may be t0=66.67 us. If the subcarrier space is 2*SC0=30 kHz, the corresponding symbol duration may be t0/2=33.33 us.

Still referring to FIG. 3, in accordance with embodiments of the present disclosure, the method 300 may be performed by a network device, for example the BS 110 of FIG. 1. In such embodiments, the BS 110 may determine a target transmission pattern from the set of candidate transmission patterns for each of terminal devices (for example UEs 121 and 122) served by the network device, without requiring the target transmission pattern is the same for each of terminal devices.

In some embodiments, the method 300 may be performed by a terminal device, for example UE 121 or UE 122. In such embodiment, the UE 121 or 122 may determine a target transmission pattern that is suitable for transmitting signals between it and the BS 110.

In some embodiments, the subcarrier space of the DL transmission part and/or the UL transmission part of the target transmission pattern may be larger than a first predetermined subcarrier space, such that the DL transmission part and/or the UL transmission part is transmitted in a reduced symbol duration. The first predetermined subcarrier space may be a predetermined or predefined according to feedback requirements, scheduling requirements, service types, and/or the like. If the subcarrier space of the DL transmission part and/or the UL transmission part of the target transmission pattern is larger than the first predetermined subcarrier space, it may be determined that the subcarrier space is large enough to obtain a reduced symbol duration.

In some embodiments, the subcarrier space of the DL transmission part and/or the UL transmission part of the target transmission pattern may be less than a second predetermined subcarrier space, such that the DL transmission part and/or the UL transmission part is transmitted in an increased symbol duration. The second predetermined subcarrier space may be a predetermined or predefined according to feedback requirements, scheduling requirements, service types, and/or the like. If the subcarrier space of the DL transmission part and/or the UL transmission part of the target transmission pattern is less than the second predetermined subcarrier space, it may be determined that the subcarrier space is small enough to obtain an increased symbol duration.

In some embodiments, the DL transmission part may be used for transmitting one or more of: DL control information (for example, Downlink Control Information (DCI)), DL data, and a DL reference signal (for example, a demodulation reference signal (DMRS), a channel state information reference signal (CSI-RS), and so on).

In some embodiments, the UL transmission part is used for transmitting one or more of: feedback about DL transmission (for example, Acknowledgement (ACK)/Negative Acknowledgement (NACK)), UL control information (for example, Uplink Control Information (UCI)), UL data, and a UL reference signal (for example, a UL DMRS, a sounding reference signal (SRS), and so on).

In some embodiments, one or more of the candidate transmission patterns may further include a GP part. The GP part may be between the DL transmission part and the UL transmission part.

In some embodiments, the target transmission pattern may include an indication for indicating itself. In an embodiment, the indication may be included in control information transmitted in the DL transmission part and/or the UL transmission part, for example, DCI, UCI, and the like. In some embodiments, the indication may indicate one or more of: the subcarrier space of the DL transmission part and/or the UL transmission part; a time duration of a symbol for the DL transmission part and/or the UL transmission part; a number of symbols for the DL transmission part and/or the UL transmission part; and whether there is communication on the DL transmission part or the UL transmission part.

In another embodiment, the indication of target transmission pattern may be included in predefined time-frequency resources. And the resources may be common to all UEs and may be not limited to resources defined in the target transmission pattern.

Still referring to FIG. 3, in block 320, communication is performed between a network device and a terminal device by using the target transmission pattern. In some embodiments, when the network device (for example, the BS 110) determines the target transmission pattern for the terminal device (for example, the UE 122) in block 310, it may perform communication with the UE 122 by using the target transmission pattern. For instance, the BS 110 may send data to the UE 122 or receive data from the UE 122 according to the target transmission pattern.

Alternatively, when the terminal device (for example, the UE 122) determines the target transmission pattern in block 310, it may perform communication with the BS 110 by using the target transmission pattern. For instance, the UE 122 may send data to the BS 110 or receive data from the BS 110 according to the target transmission pattern.

Figure 5:
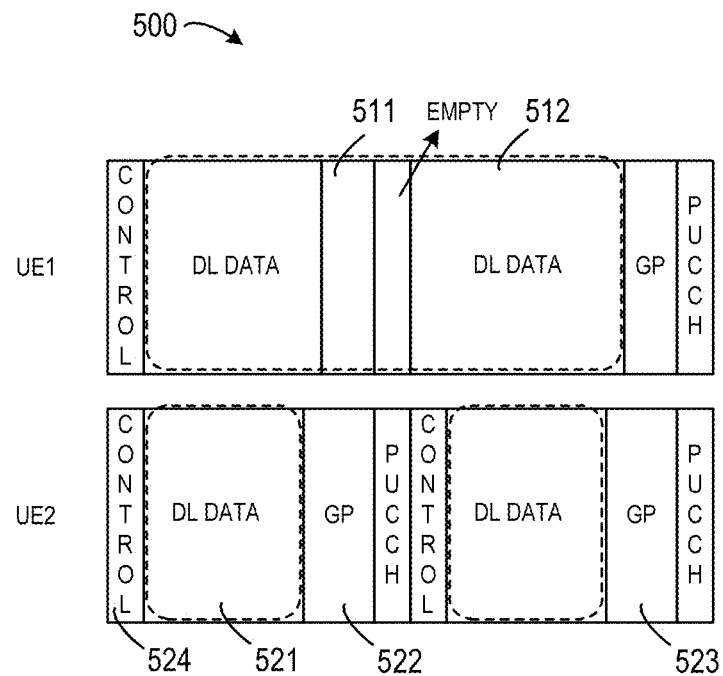
FIG. 5 illustrates a diagram 500 of transmission patterns for different terminal devices, UE1 and UE2, with respect to TDD and different GP durations according to embodiments of the present disclosure.

FIG. 5 illustrates a diagram 500 of transmission patterns for different terminal devices, UE1 and UE2, with respect to TDD and different GP durations according to embodiments of the present disclosure. In the example of FIG. 5, the eMBB terminal device is referred to as UE1 and the URLLC terminal device is referred to as UE2. As to UE2, two transmission patterns are shown and they are the same. The DL transmission part 521 is for transmitting DL data and described as short downlink region including less symbols. In an embodiment, the number of symbols of the DL transmission part 521 may be indicated by DCI, which is included in another DL transmission part 524 for transmitting control information.

In accordance with embodiments of the present disclosure, different numerology may be employed for transmissions of UL data, DL data, DL control information (for example, transmission formats, UL grant, or information about resource allocation on Physical Downlink Control Channel (PDCCH)), UL control information (for example ACK/NACK or RS on Physical Uplink Control Channel (PUCCH)), and/or the like. The numerology may refer to, for example, the subcarrier space in frequency domain, the time duration for a symbol, the time duration for Cyclic prefix (CP), and/or the like.

For downlink transmission, there may be a plurality of downlink configurations of subcarrier space, for example, denoted as $K_{D\_0}$, $K_{D\_1}$ ..., $K_{D\_n}$ kHz, respectively. For uplink transmission, there may be a plurality of uplink configurations of subcarrier space, for example, denoted as $K_{U\_0}$, $K_{U\_1}$ ..., $K_{U\_n}$ kHz. Different downlink configurations of subcarrier space/uplink configurations of subcarrier space may be used for different services, for example, eMBB service and URLLC service, or different channels (for example, PDCCH, Physical Downlink Shared Channel (PDSCH), Physical Uplink Shared Channel (PUSCH) and PUCCH).

In an embodiment, it is assumed that the subcarrier space for downlink data transmission may be $K_0$ kHz, and the subcarrier space for the feedback information (ACK/NACK) may be $K_1$ (for example, $M*K_0$) kHz. Thus, the symbol duration for the feedback information may be different from downlink symbol, for example, 1/M of the downlink symbol.

In another embodiment, it is assumed that the subcarrier space for control information is $K_1$ (for example, $M*K_0$) kHz, and the subcarrier space for downlink or uplink data transmission is $K_0$ kHz SCS. Thus, the symbol duration for the control information may be different from, for example 1/M of, the symbol duration for the downlink or uplink data transmission.

In embodiments of the present disclosure, different configurations of subcarrier space may be referred as different numerology. Now some embodiments related to the different numerology are described with reference to FIGS. 6-15.

Figure 6:
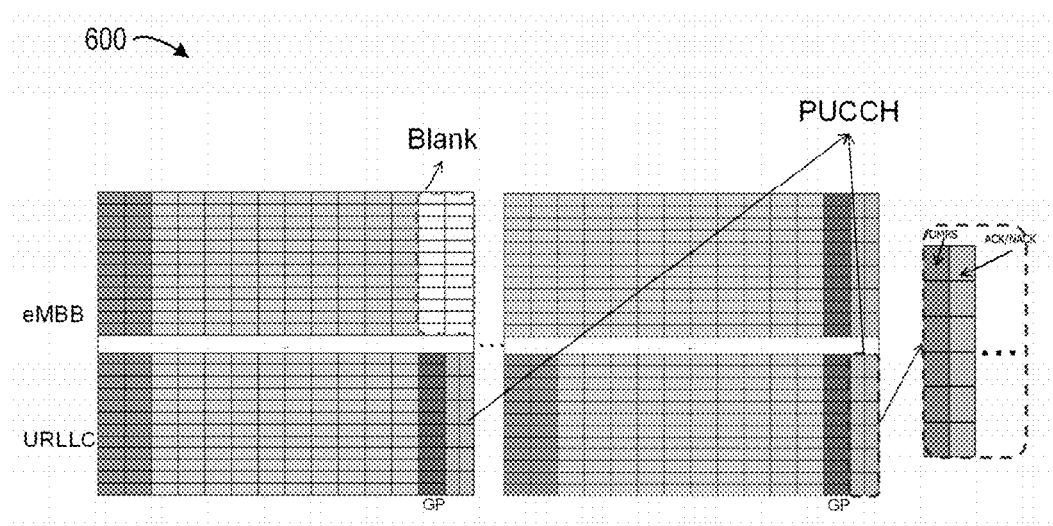
FIG. 6 illustrates a diagram 600 of different numerology according to embodiments of the present disclosure.

FIG. 6 illustrates a diagram 600 of different numerology according to embodiments of the present disclosure. In the example of FIG. 6, different numerology are used for feedback information (ACK/NACK) and downlink data. For example, 15 kHz subcarrier space (also referred to as "SCS") is used for downlink data, and 30 kHz is used for ACK/NACK. As such, the symbol duration of the downlink data may be two times of the symbol duration of ACK/NACK. In an embodiment, two symbols used for transmitting ACK/NACK may be used to transmit ACK/NACK in one of the two symbols and transmitting a reference signal (for example, DMRS) in the other of the two symbols. For example, the first one of the two symbols is used for DMRS, and the second one is used for ACK/NACK transmission.

In this case, it may be determined that two 30 kHz-symbols are used for DMRS and ACK/NACK of URLLC UE 122. For the eMBB UE 121, there is an empty 15 kHz-symbol. And in another case, the eMBB UE 121, there is a 15 kHz-symbol for uplink transmission, for example, SRS transmission, or ACK/NACK transmission for UE 121.

Figure 7:
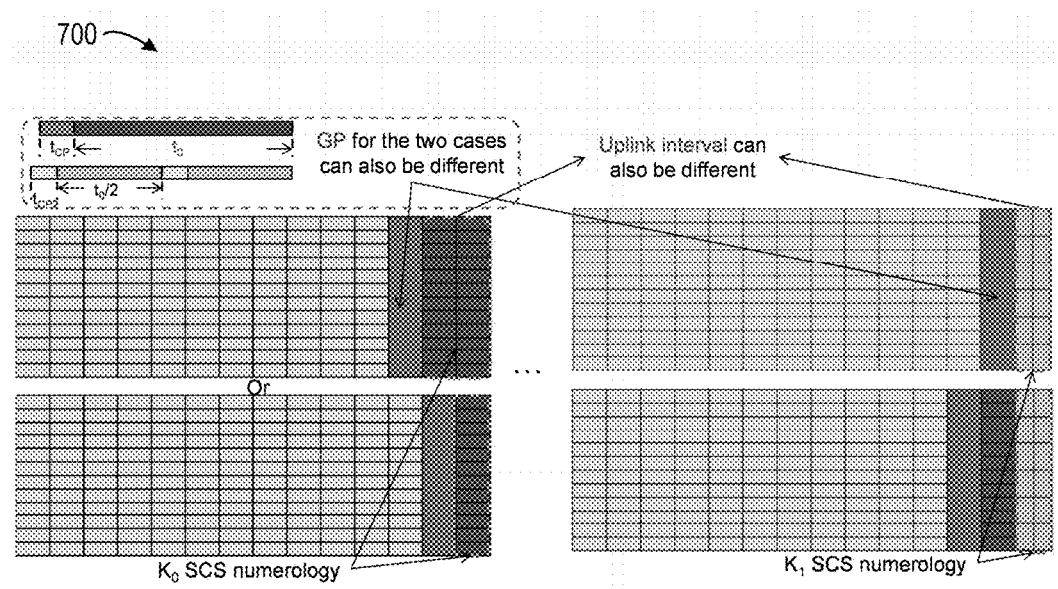
FIG. 7 illustrates a diagram 700 of different numerology according to embodiments of the present disclosure.

FIG. 7 illustrates a diagram 700 of different numerology according to embodiments of the present disclosure. In the example of FIG. 7, the uplink transmission interval may be different for different numerology. In an embodiment, the ACK/NACK transmission may at least need two symbols, one for DMRS and one for ACK/NACK. In another embodiment, if SRS is used for reciprocity, its numerology may be kept the same as downlink data transmission. In a still further embodiment, if ACK/NACK collides with SRS, more uplink symbols may be used by the ACK/NACK.

In the embodiments of FIG. 7, the time duration of GP may be same or different. In an embodiment, for example, if there are two SCSs, $K_0$ and $K_1=M*K_0$, the symbol duration for $M*K_0$ may be 1/M of the symbol duration ($t_0$) for $K_0$, the Cyclic prefix (CP) duration ($t_{CP2}$) for $M*K_0$ may also be 1/M of the symbol duration ($t_0$)) for $K_0$. The time duration for GP may be the same for different numerology. In another embodiment, the time duration of GP may be different. For example, if there are two SCSs, $K_0$ and $K_1=M*K_0$, the symbol duration for $M*K_0$ may be 1/M of the symbol duration ($t_0$) for $K_0$, the CP duration ($t_{CP2}$) for $M*K_0$ may not be 1/M of the symbol duration ($t_{CP}$) for $K_0$ (for example, $t_{CP2}$ is same with or a little shorter than $t_{CP}$, to resist multi-path effect). Accordingly, the time duration remaining for GP may be different for different numerology.

Figure 8:
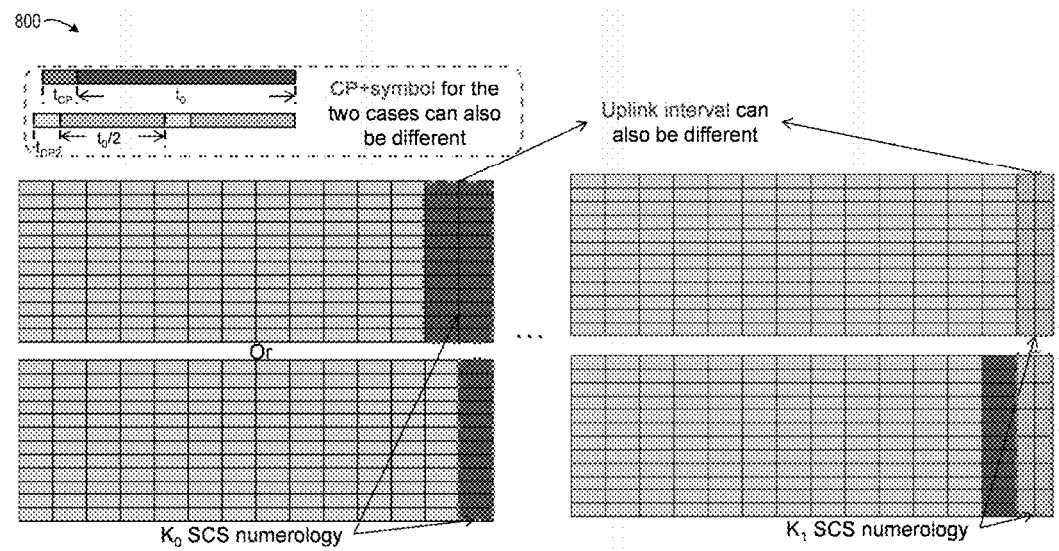
FIG. 8 illustrates a diagram 800 of different numerology according to embodiments of the present disclosure.

FIG. 8 illustrates a diagram 800 of different numerology according to embodiments of the present disclosure. In the example of FIG. 8, the uplink transmission interval may be the same or different for different numerology. In an embodiment, the ACK/NACK transmission may at least need two symbols, one for DMRS and one for ACK/NACK. For example, the subcarrier space for uplink data transmission, and/or SRS, and/or downlink data transmission is $K_0$ and the subcarrier space for ACK/NACK is $K_1=M*K_0$, the symbol duration for $M*K_0$ may be 1/M of the symbol duration ($t_0$) for $K_0$, the Cyclic prefix (CP) duration ($t_{CP2}$) for $M*K_0$ may also be 1/M of the symbol duration ($t_0$)) for $K_0$.

In another embodiment, for example, the symbol duration for $M*K_0$ may be 1/M of the symbol duration ($t_0$) for $K_0$, the CP duration ($t_{CP2}$) for $M*K_0$ may not be 1/M of the symbol duration ($t_0$)) for $K_0$ (for example, $t_{CP}$ is same with or a little shorter than $t_{CP}$, to resist multi-path effect), the uplink transmission part of different numerology may be different.

In another embodiment, for different numerology, enough symbol number is required. For example, ACK/NACK transmission may at least need two symbols, one is for DMRS, and the other is for ACK/NACK, accordingly, the ACK/NACK transmission interval for different numerology may be different.

In another embodiment, if SRS is used for reciprocity, its numerology may be kept the same as downlink data transmission. In a still further embodiment, if ACK/NACK collides with SRS, more uplink symbols may be used by the ACK/NACK.

Figure 9:
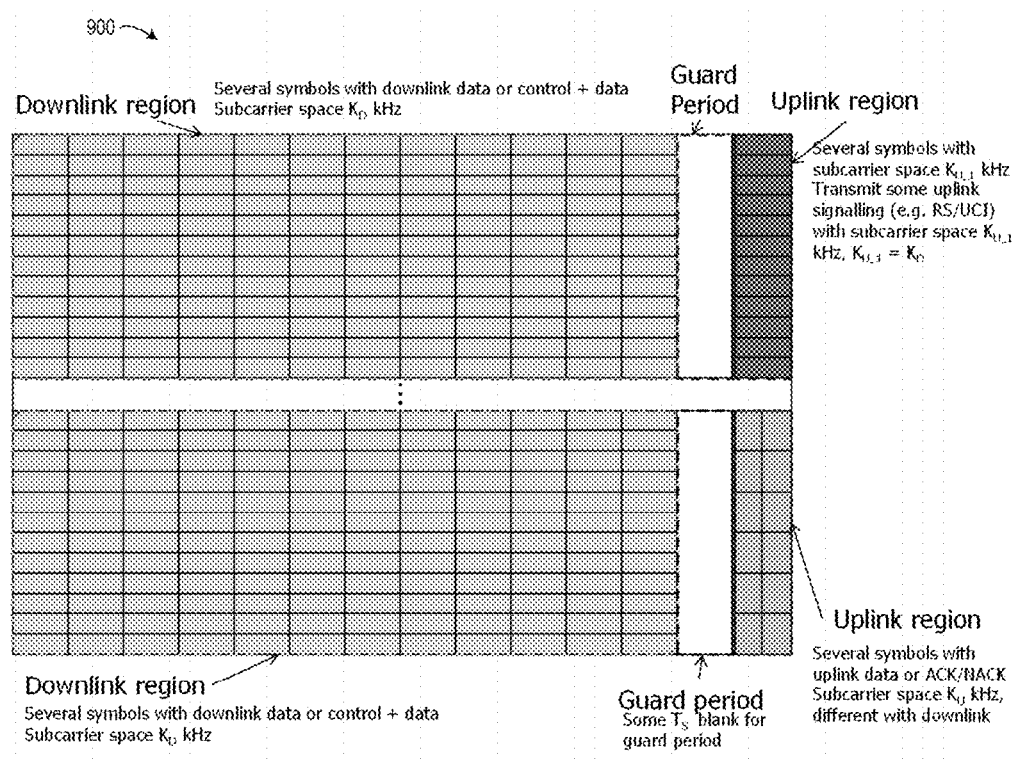
FIG. 9 illustrates a diagram 900 of different numerology according to embodiments of the present disclosure.

FIG. 9 illustrates a diagram 900 of different numerology according to embodiments of the present disclosure. In the example of FIG. 9, for some UE, uplink transmission has the same subcarrier space with that of the downlink transmission, and for some other UE, uplink transmission has a different subcarrier space from that of the downlink transmission. Different uplink signalling or different services may have different subcarrier spaces, e.g. SRS with same SCS of downlink and ACK/NACK with different SCS of downlink. For a downlink transmission part (also referred to as a downlink region), the subcarrier spaces may be $K_D$ kHz, and the time duration of GP may be several Ts (Ts is a basic time unit).

Figure 10:
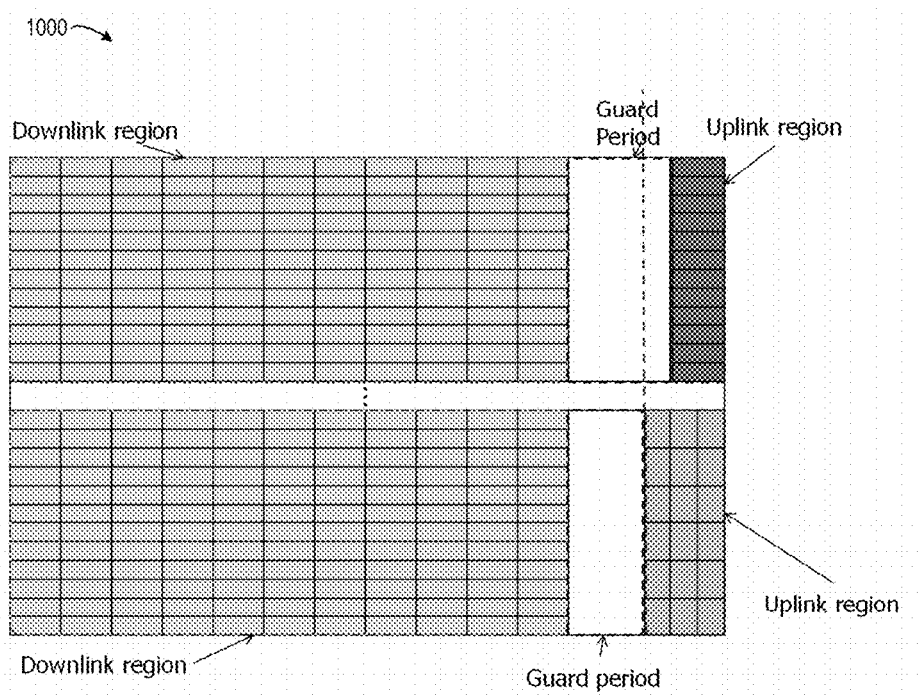
FIG. 10 illustrates a diagram 1000 of different numerology according to embodiments of the present disclosure.
Figure 11:
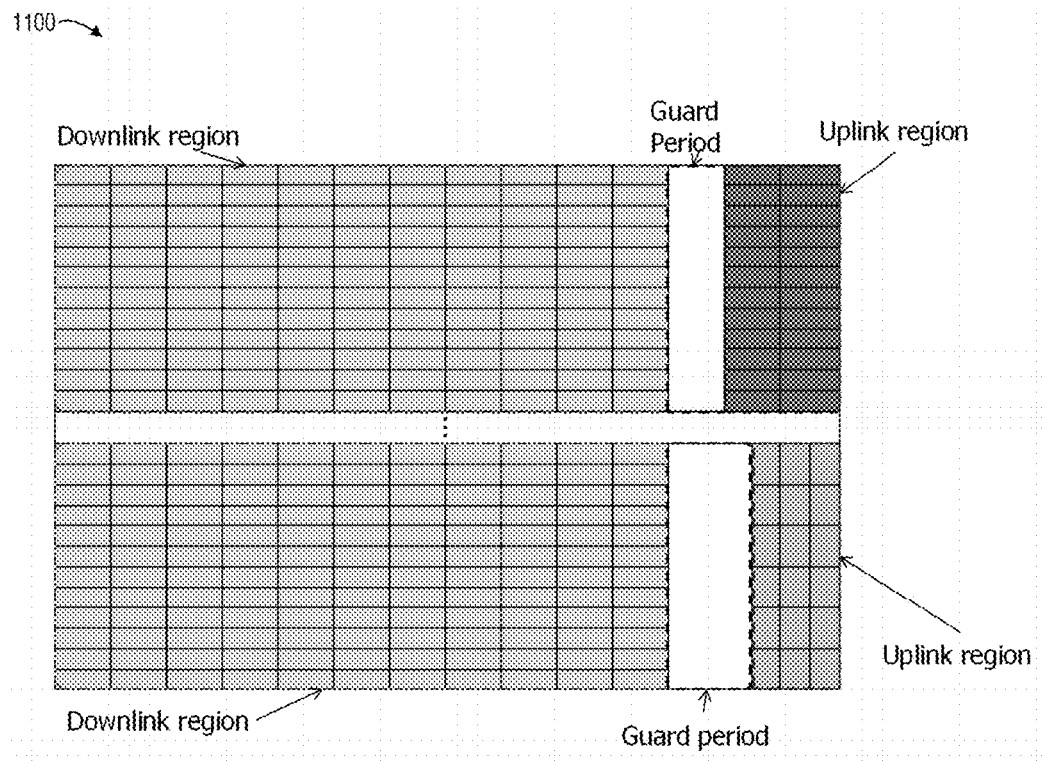
FIG. 11 illustrates a diagram 1100 of different numerology according to embodiments of the present disclosure.

FIG. 10 illustrates a diagram 1000 of different numerology according to embodiments of the present disclosure. In the example of FIG. 10, for some UE, uplink transmission has the same subcarrier space with that of the downlink transmission, and for some other UE, uplink transmission has a different subcarrier space from that of the downlink transmission. Different uplink signalling or different services may have different subcarrier spaces, e.g. SRS with same SCS of downlink and ACK/NACK with different SCS of downlink. GP may be different for different uplink SCS, for example, symbol duration is different for different SCS, and the transmission duration is different for different SCS, and the remaining period for GP is different. For a downlink region, the subcarrier spaces may be $K_{D\_0}$ kHz, $K_{D\_1}$ kHz or the like, and the time duration of GP may be several Ts. The GP and Symbol number for different numerology may be different. FIG. 11 illustrates a diagram 1100 of different numerology according to embodiments of the present disclosure. In the example of FIG. 11, for some UE, uplink transmission has the same subcarrier space from that of the downlink transmission, and for some other UE, uplink transmission has a different subcarrier space from that of the downlink transmission. Different uplink signalling or different services may have different subcarrier space, e.g. SRS with same SCS of downlink and ACK/NACK with different SCS of downlink. GP may be different for different uplink SCS, for example, symbol duration is different for different SCS, and the transmission duration is different for different SCS, and the remaining period for GP is different. For a downlink part (also referred to as a downlink region), the subcarrier spaces may be $K_{D\_0}$ kHz, $K_{D\_1}$ kHz or the like, and the time duration of GP may be several Ts. The GP and Symbol number for different numerology may be different.

Figure 12A:
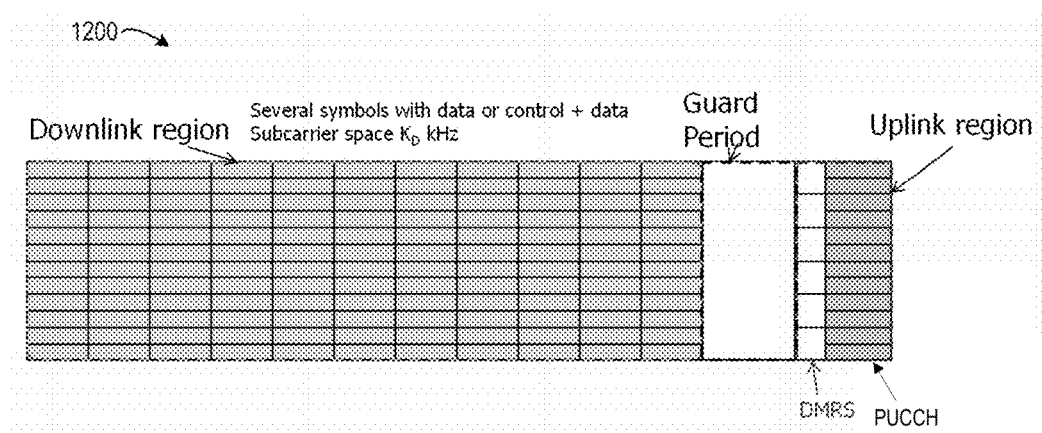
FIGS. 12A and 12B illustrate diagrams 1200 and 1250 of different numerology for DMRS and PUCCH according to embodiments of the present disclosure.
Figure 12B:
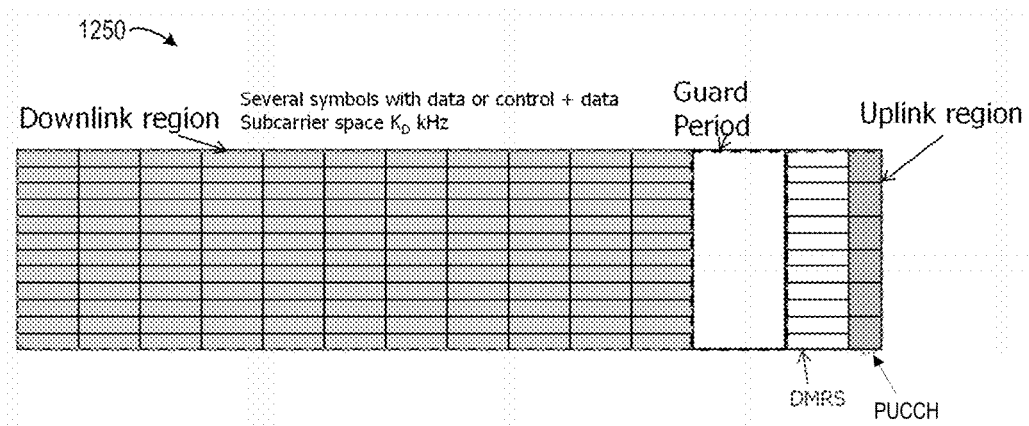

FIGS. 12A and 12B illustrate diagrams 1200 and 1250 of different numerology for DMRS and PUCCH according to embodiments of the present disclosure. In the example of FIGS. 12A and 12B, for a downlink region, the subcarrier spaces may be $K_D$ kHz, and numerology for uplink DMRS and PUCCH may be different. In FIG. 12A, Numerology for uplink DMRS and PUCCH are different, the symbol number for DMRS and PUCCH may be different. In FIG. 12B, Numerology for uplink DMRS and PUCCH are different.

Figure 13A:
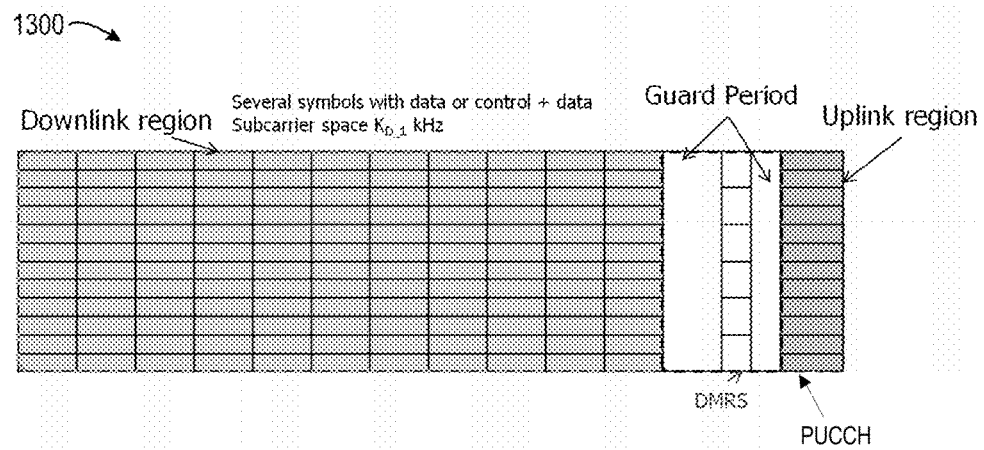
FIGS. 13A and 13B illustrate diagrams 1300 and 1350 of different numerology for DMRS multiplexed in different symbols according to embodiments of the present disclosure.
Figure 13B:
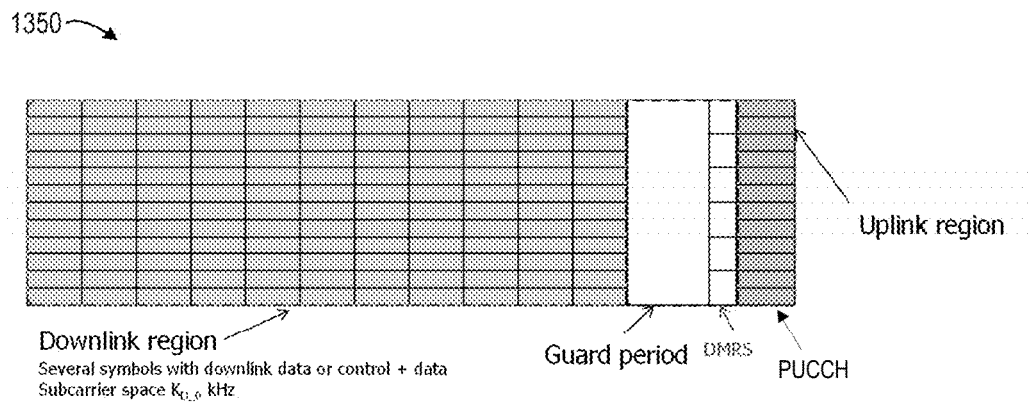

FIGS. 13A and 13B illustrate diagrams 1300 and 1350 of different numerology for DMRS multiplexed in different symbols according to embodiments of the present disclosure. In the example of FIGS. 13A and 13B, for a downlink region, the subcarrier spaces may be $K_{D\_0}$ kHz, $K_{D\_1}$ kHz or the like, and the time duration of GP may be several Ts. The DMRS may have different positions for multiplexing.

Figure 14:
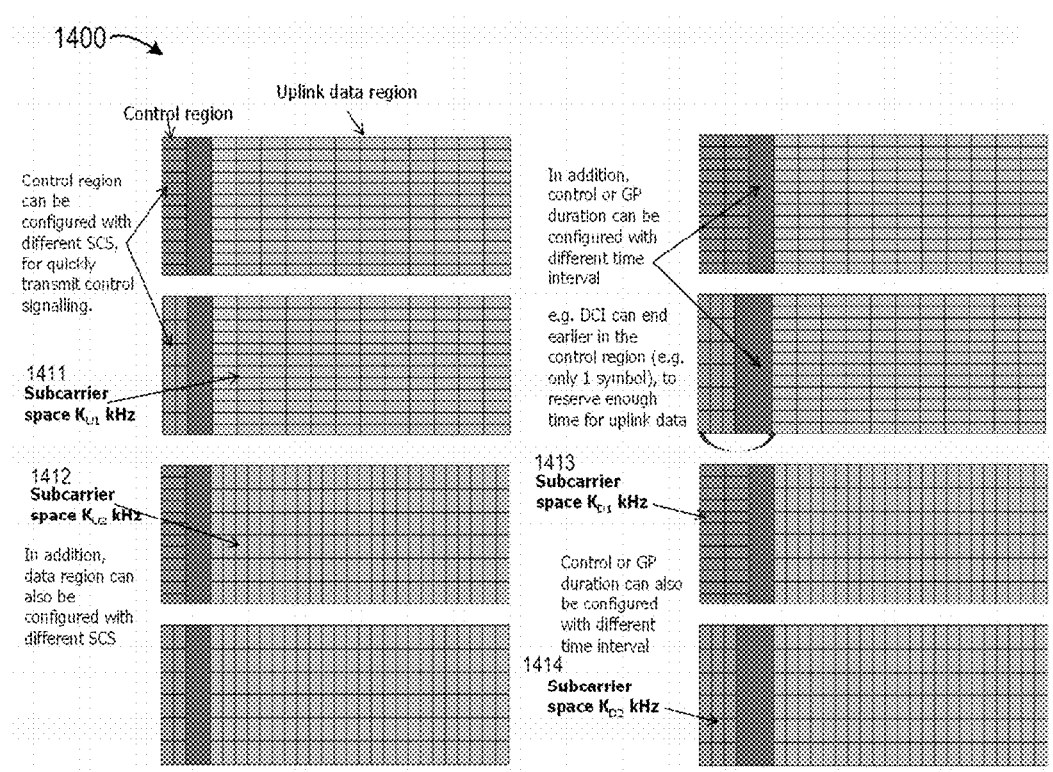
FIG. 14 illustrates a diagram 1400 of different numerology for control information and data in an uplink-centric transmission pattern according to embodiments of the present disclosure.

FIG. 14 illustrates a diagram 1400 of different numerology for control information and data in an uplink-centric transmission pattern according to embodiments of the present disclosure. In the example of FIG. 14, one or more of the control region, data region and GP duration may be configured with different SCS. As shown, the uplink data region 1411 has a subcarrier space of $K_{u1}$ kHz, while the uplink data region 1412 has a subcarrier space of $K_{u2}$ kHz. The control region 1413 has a subcarrier space of $K_{D1}$ kHz, while the control region 1414 has a subcarrier space of $K_{D2}$ kHz.

Figure 15:
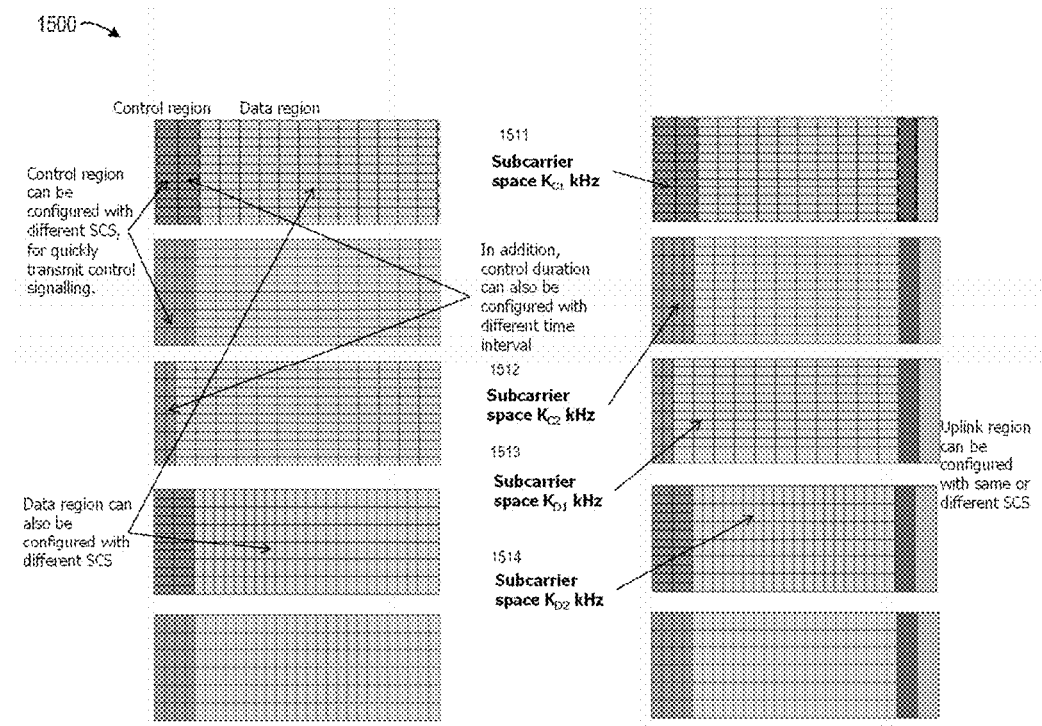
FIG. 15 illustrates a diagram 1500 of different numerology for control information and data in a downlink-centric transmission pattern according to embodiments of the present disclosure.

FIG. 15 illustrates a diagram 1500 of different numerology for control information and data in a downlink-centric transmission pattern according to embodiments of the present disclosure. In the example of FIG. 15, one or more of the control region, data region and GP duration may be configured with different SCS for quick transmission. As shown, the control region 1511 has a subcarrier space of $K_{C1}$ kHz, while the control region 1515 has a subcarrier space of $K_{C5}$. The downlink data region 1513 has a subcarrier space of $K_{D1}$ kHz, while the downlink data region 1514 has a subcarrier space of $K_{D2}$ kHz.

It should be understood that the above embodiments are discussed only for the purpose of enabling those skilled persons in the art to better understand and thus implement the present disclosure, rather than suggesting any limitations on the scope of the present disclosure.

Figure 16:
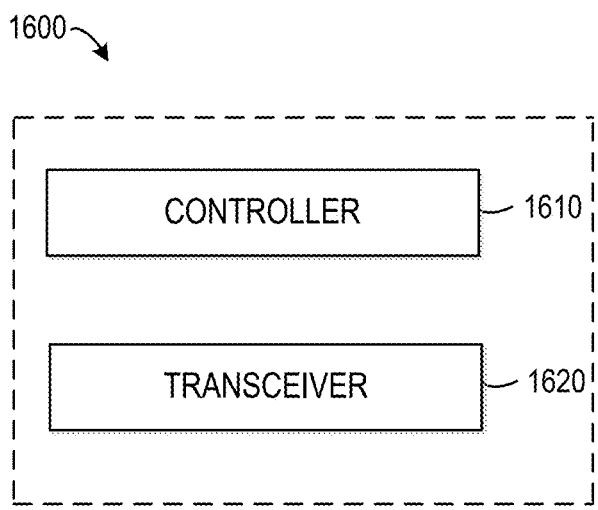
FIG. 16 illustrates a schematic diagram of a device 1600 according to an embodiment of the present disclosure.

FIG. 16 illustrates a schematic diagram of a device 1600 according to an embodiment of the present disclosure. According to embodiments of the present disclosure, the device 1600 may be implemented at a network device, such as the BS 110, a terminal device, such as the UE 121 or 122, or other suitable device in the communication system.

As shown in FIG. 16, the device 1600 comprises: a controller 1610 configured to determine a target transmission pattern from a set of candidate transmission patterns, wherein each of the candidate transmission patterns contains a DL transmission part and/or a UL transmission part, and the candidate transmission patterns differ from one another in terms of space carriers of the respective DL transmission parts and/or the UL transmission parts; and a transceiver 1620 configured to perform communication between a network device and a terminal device by using the target transmission pattern.

In an embodiment, the subcarrier space of the DL transmission part and/or the UL transmission part of the target transmission pattern may be larger than a first predetermined subcarrier space, such that the DL transmission part and/or the UL transmission part is transmitted in a reduced symbol duration.

In an embodiment, the subcarrier space of the DL transmission part and/or the UL transmission part of the target transmission pattern may be less than a second predetermined subcarrier space, such that the DL transmission part and/or the UL transmission part is transmitted in an increased symbol duration.

In an embodiment, the DL transmission part may be used for transmitting one or more of: DL control information, DL data, and a DL reference signal.

In an embodiment, the UL transmission part may be used for transmitting one or more of: feedback about DL transmission, UL control information, UL data, and a UL reference signal.

In an embodiment, one or more of the candidate transmission patterns may further include a GP part between the DL transmission part and the UL transmission part.

In an embodiment, the controller is further configured to determine, at the network device, a target transmission pattern from the set of candidate transmission patterns for each of terminal devices served by the network device, without requiring the target transmission pattern is the same for each of terminal devices.

In an embodiment, the target transmission pattern may include an indication in control information transmitted in the DL transmission part and/or the UL transmission part, wherein the indication indicates one or more of: the subcarrier space of the DL transmission part and/or the UL transmission part; a time duration of a symbol for the DL transmission part and/or the UL transmission part; a number of symbols for the DL transmission part and/or the UL transmission part; and whether there is communication on the DL transmission part or the UL transmission part.

Embodiments of the present disclosure also provided an apparatus implemented at a network device or a terminal device. The apparatus may include means for determining a target transmission pattern from a set of candidate transmission patterns, wherein each of the candidate transmission patterns contains a DL transmission part and/or an UL transmission part, and the candidate transmission patterns differ from one another in terms of subcarrier spaces of the respective DL transmission parts and/or the UL transmission parts; and means for performing communication between a network device and a terminal device by using the target transmission pattern.

It is also to be noted that the device 1600 may be respectively implemented by any suitable technique either known at present or developed in the future. Further, a single device shown in FIG. 16 may be alternatively implemented in multiple devices separately, and multiple separated devices may be implemented in a single device. The scope of the present disclosure is not limited in these regards.

It is noted that the device 1600 may be configured to implement functionalities as described with reference to FIGS. 3-15. Therefore, the features discussed with respect to the method 300 may apply to the corresponding components of the device 1600. It is further noted that the components of the device 4200 may be embodied in hardware, software, firmware, and/or any combination thereof. For example, the components of the device 1600 may be respectively implemented by a circuit, a processor or any other appropriate device. Those skilled in the art will appreciate that the aforesaid examples are only for illustration not limitation.

In some embodiment of the present disclosure, the device 1600 may comprise at least one processor. The at least one processor suitable for use with embodiments of the present disclosure may include, by way of example, both general and special purpose processors already known or developed in the future. The device 1600 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the device 1600 to at least perform according to the method 300 as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIG. 3 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method performed by a terminal device, comprising:
   determining at least one transmission pattern, wherein the at least one transmission pattern contains a downlink (DL) transmission part and an uplink (UL) transmission part, wherein the downlink transmission part comprises 12 downlink symbols;
   receiving at least one of a value of subcarrier spacing of the DL transmission part and a value of subcarrier spacing of the UL transmission part; and
   performing a Physical Uplink Control Channel (PUCCH) transmission using one or two symbols on the UL transmission part,
   wherein there is a period between the DL transmission part and UL transmission part, and
      based on the value of subcarrier spacing of the UL transmission part being same as the value of subcarrier spacing of the DL transmission part, the UL transmission part comprises one uplink symbol; and
      based on the value of subcarrier spacing of the UL transmission part being two times of the value of subcarrier spacing of the DL transmission part, the UL transmission part comprises two uplink symbols.

2. The method according to claim 1, wherein the subcarrier spacing of the DL transmission part or the UL transmission part of the at least one transmission pattern is larger than a first predetermined subcarrier spacing, such that the DL transmission part or the UL transmission part is transmitted in a reduced symbol duration.

3. The method according to claim 1, wherein the subcarrier spacing of the DL transmission part or the UL transmission part of the at least one transmission pattern is less than a second predetermined subcarrier spacing, such that the DL transmission part or the UL transmission part is transmitted in an increased symbol duration.

4. The method according to claim 1, wherein the DL transmission part is used for transmitting one or more of: DL control information, DL data, and a DL reference signal.

5. The method according to claim 1, wherein the UL transmission part is used for transmitting one or more of: feedback about DL transmission, UL control information, UL data, and a UL reference signal.

6. The method according to claim 1, further comprising information indicating a number of symbols for the DL transmission part or the UL transmission part.

7. A terminal device, comprising a processor configured to:
   determine at least one transmission pattern, wherein the at least one transmission pattern contains a downlink (DL) transmission part and an uplink (UL) transmission part, wherein the downlink transmission part comprises 12 downlink symbols;
   receive at least one of a value of subcarrier spacing of the DL transmission part and a value of subcarrier spacing of the UL transmission part; and
   performing a Physical Uplink Control Channel (PUCCH) transmission using one or two symbols on the UL transmission part,
   wherein there is a period between the DL transmission part and UL transmission part, and
      based on the value of subcarrier spacing of the UL transmission part being same as the value of subcarrier spacing of the DL transmission part, the UL transmission part comprises one uplink symbol; and
      based on the value of subcarrier spacing of the UL transmission part being two times of the value of subcarrier spacing of the DL transmission part, the UL transmission part comprises two uplink symbols.

8. The terminal device according to claim 7, wherein the subcarrier spacing of the DL transmission part or the UL transmission part of the at least one transmission pattern is larger than a first predetermined subcarrier spacing, such that the DL transmission part or the UL transmission part is transmitted in a reduced symbol duration.

9. The terminal device according to claim 7, wherein the subcarrier spacing of the DL transmission part or the UL transmission part of the at least one transmission pattern is less than a second predetermined subcarrier spacing, such that the DL transmission part or the UL transmission part is transmitted in an increased symbol duration.

10. The terminal device according to claim 7, wherein the DL transmission part is used for transmitting one or more of: DL control information, DL data, and a DL reference signal.

11. The terminal device according to claim 7, wherein the UL transmission part is used for transmitting one or more of: feedback about DL transmission, UL control information, UL data, and a UL reference signal.

12. The terminal device according to claim 7, wherein the processor is further configured to receive information indicating a number of symbols for the DL transmission part or the UL transmission part.

* * * * *